(12) United States Patent
Newman et al.

(10) Patent No.: US 10,736,181 B2
(45) Date of Patent: Aug. 4, 2020

(54) BASKING HEATER AND METHODS

(71) Applicant: Spectrum Brands, Inc., Middleton, WI (US)

(72) Inventors: Daniel A. Newman, Salem, VA (US); Jose Manuel Torres Perez, Parkland, FL (US); Derek James Meyers, Blacksburg, VA (US); Joseph Christopher Carley, Blacksburg, VA (US)

(73) Assignee: Spectrum Brands, Inc., Middleton, WI (US)

( * ) Notice: Subject to any disclaimer, the term of this patent is extended or adjusted under 35 U.S.C. 154(b) by 1030 days.

(21) Appl. No.: 14/739,155

(22) Filed: Jun. 15, 2015

(65) Prior Publication Data
US 2015/0373786 A1 Dec. 24, 2015

Related U.S. Application Data

(60) Provisional application No. 62/014,370, filed on Jun. 19, 2014.

(51) Int. Cl.
*H05B 3/20* (2006.01)
*A01K 63/06* (2006.01)

(52) U.S. Cl.
CPC ............. *H05B 3/20* (2013.01); *A01K 63/065* (2013.01)

(58) Field of Classification Search
CPC .. F24C 7/065; F24C 7/043; F24C 1/14; F24C 7/081; F24C 15/003; F24C 15/22; F24C 7/04; F24C 7/08; F24H 3/0417; F24H 3/0411; F24H 9/2014; F24H 3/0405; F24H 9/2071; F04D 25/08; F04D 29/4226

USPC ....... 392/376, 373, 422, 365, 375, 347, 360, 392/364, 367, 370, 383, 390; 219/220, 219/476, 481, 518, 524, 526; 362/92,
(Continued)

(56) References Cited

U.S. PATENT DOCUMENTS 3,769,935 A 11/1973 Johnson
3,842,241 A 10/1974 Isaacson et al.
(Continued)

FOREIGN PATENT DOCUMENTS

CN 202799911 U 3/2013
DE 7003687 U 6/1970
(Continued)

OTHER PUBLICATIONS

Exo Terra Desert Heat Wave Mat Substrate Heater, http://www.drsfostersmith.com/product/prod_display.cfm?c=6016+11148+20114+22806&pcatid=22806, 4 pages (known at least as early as Apr. 18, 2014).
(Continued)

*Primary Examiner* — Tu B Hoang
*Assistant Examiner* — Vy T Nguyen
(74) *Attorney, Agent, or Firm* — Merchant & Gould P.C.

(57) ABSTRACT

A basking heater for an animal, such as a reptile, includes a housing, a heating element within the housing, and an opening in a bottom of the housing, so that the heating element may radiate heat through the opening, and an attachment arrangement. The attachment arrangement can be used to selectively attach the heater to a terrarium. The housing can be made of thermal plastic resin and can include vents for cooling the housing. The housing can have low profile shape. The heater may have multiple power settings.

15 Claims, 10 Drawing Sheets

(58) Field of Classification Search
USPC ........ 362/410, 418; 239/376, 377, 379, 571,
239/577, 583; 248/324, 327; 315/104,
315/118, 158; 340/540; 416/246
See application file for complete search history.

(56) References Cited

U.S. PATENT DOCUMENTS

| | | |
|---|---|---|
| 3,890,486 A | 6/1975 | Fitzgerald |
| 4,026,243 A | 5/1977 | Jessop, III |
| 4,124,793 A | 11/1978 | Colman |
| 4,201,153 A | 5/1980 | Nace |
| 4,234,780 A | 11/1980 | McCarthy |
| 4,754,571 A | 7/1988 | Riechmann |
| 5,010,845 A | 4/1991 | Azpurua et al. |
| 5,023,433 A | 6/1991 | Gordon |
| 5,121,709 A | 6/1992 | Wechsler |
| 5,183,004 A | 2/1993 | Trent et al. |
| 5,272,316 A | 12/1993 | Chesnut |
| 5,307,762 A * | 5/1994 | Englert ................. A01K 63/06 119/266 |
| 5,315,965 A | 5/1994 | Davis |
| 5,371,340 A | 12/1994 | Stanfield |
| 5,404,839 A | 4/1995 | Mancuso |
| 5,406,054 A | 4/1995 | Chirdon |
| 5,437,001 A * | 7/1995 | Chaney ................. F24C 7/065 392/373 |
| 5,713,304 A | 2/1998 | de Vosjoli et al. |
| 5,794,567 A * | 8/1998 | Itzhak ................. A01K 63/003 119/416 |
| 5,842,439 A * | 12/1998 | Selstad ................ A01K 63/003 119/481 |
| 6,040,564 A * | 3/2000 | Ueda .................. H05B 6/6479 219/401 |
| 6,106,869 A | 8/2000 | Botterman et al. |
| 6,637,374 B2 | 10/2003 | Hawks et al. |
| 6,758,162 B1 | 7/2004 | Van Heygen |
| 7,481,183 B2 | 1/2009 | Van Heygen |
| 9,706,758 B1 * | 7/2017 | Barnes, III ............. A01K 63/06 |
| 2001/0018081 A1 | 8/2001 | Botterman et al. |
| 2002/0148410 A1 * | 10/2002 | Thomas ............... A01K 1/0236 119/452 |
| 2006/0243214 A1 * | 11/2006 | Van Heygen .......... A01K 63/06 119/267 |
| 2010/0218728 A1 | 9/2010 | Hughes |
| 2012/0153191 A1 | 6/2012 | Kane et al. |
| 2013/0305605 A1 | 11/2013 | Wang |
| 2014/0001171 A1 * | 1/2014 | Wang .................. A01K 63/065 219/385 |
| 2014/0299593 A1 * | 10/2014 | Casey .................. H05B 3/565 219/476 |

FOREIGN PATENT DOCUMENTS

| | | |
|---|---|---|
| DE | 82 12 984 U1 | 7/1982 |
| DE | 20 2004 006 120 U1 | 8/2004 |
| DE | 10 2009 037 767 A1 | 3/2011 |
| EP | 2 683 214 A1 | 1/2014 |
| JP | 2012-43577 | 3/2012 |

OTHER PUBLICATIONS http://www.youtube.com/watch?v=I4FM3Z-4VJY (known at least as early as Jun. 2, 2014).
International Search Report and Written Opinion for Application No. PCT/US2015/035843 dated Oct. 5, 2015.
Reptile Heating & Lighting, http://www.ultimatereptiles.com.au/care-info/42-reptile-heating-a-lighting-.html, 2 pages (known at least as early as Apr. 18, 2014).
Terrarium heater, http://www.oocities.org/warmpets/vetnary_reptile.html, 4 pages (known at least as early as Apr. 18, 2014).
Zoo Med ReptiTherm® Habitat Heater, http://www.drsfostersmith.com/product/prod_display.cfm?c=6016+11148+20114+22805&pcatid=22805 , 5 pages (known at least as early as Apr. 18, 2014).

\* cited by examiner

BASKING HEATER AND METHODS

CROSS-REFERENCE TO RELATED APPLICATION

This application claims the benefit of provisional application Ser. No. 62/014,370, filed Jun. 19, 2014, which is incorporated herein by reference in its entirety.

TECHNICAL FIELD

This disclosure relates to heaters. In particular, this disclosure relates to basking heaters selectively and removably attachable to terrariums.

BACKGROUND

Terrarium/reptile basking heaters are heaters that provide radiated heat from above the animal. Typical prior art basking heaters include generally large and unattractive dome lamps. The domes are typically spun metal to prevent the dome from becoming too hot at the touch.

What is needed is a basking heater that overcomes the problems of the prior art. For example, what is needed is a basking heater that is decreased in sized and increased in aesthetic appeal, without allowing the housing of the heater to become too hot to the touch.

SUMMARY

A basking heater is provided including a housing defining a bottom and defining an interior; the bottom having an opening in communication with the interior; the housing including a top opposite the bottom; a heating element within the housing interior; the heating element being connected to a power source; and an attachment arrangement adapted to selectively attach the heater to a terrarium. A height of the housing from the bottom to the top can be not greater than 3 inches.

A basking heater is provided including a housing defining a bottom and defining an interior; the bottom having an opening in communication with the interior; a heating element within the housing interior; the heating element being connected to a power source and oriented to radiate heat through the opening in the bottom; and an attachment arrangement usable to selectively attach the heater to a terrarium; the attachment arrangement including both, a fastener to permit selective attachment to a screen cover on a terrarium; and a mounting bracket adapted to permit selective attachment to a top rim of a terrarium.

A basking heater is provided including a housing defining a bottom and defining an interior; the bottom having an opening in communication with the interior; a heating element within the housing interior; the heating element being connected to a power source and oriented to radiate heat through the opening in the bottom; and a power switch controlling an amount of power to the heating element; the power switch having at least 3 settings including no power, low power, and high power.

The housing bottom can be substantially planar.

The grill can be entirely within the housing interior.

The housing may include a first shell and a second shell that fit together to define the interior; the second shell having the bottom.

The housing can define a vent arrangement.

The vent arrangement can include a plurality of slots in the bottom of the housing.

The vent arrangement can include a slot at an interface between the first shell and second shell.

In some embodiments, there is an insulating arrangement adjacent to the heating element, the heating element being between the insulating arrangement and the porous grill.

The insulating arrangement can comprise a ceramic cloth.

A heat conductor may be adjacent to the insulating arrangement.

The housing includes a top opposite of the bottom; and the heat conductor can include a metal plate between the housing top and the insulating arrangement.

In some embodiments, there can be a temperature probe between the heating element and the porous grid; and a circuit board with control logic to disconnect power from the heating element when the temperature probe exceeds a predetermined value.

In some arrangements, a power switch is provided to control an amount of power to the heating element.

The power switch can have only an on/off (e.g. power or no power) switch in some embodiments; in other embodiments, the power switch can have at least 3 settings including no power, low power, and high power.

The low power can comprise about 27 W, and the high power can comprise about 41 W.

The attachment arrangement can include at least one fastener selectively securable to the housing bottom, adapted to permit selective attachment to a screen cover on a terrarium.

The at least one fastener can include a thumbscrew threadably securable into the housing bottom.

The attachment arrangement can include a mounting bracket adapted to permit selective attachment to a top rim of a terrarium.

The mounting bracket may have a depressable tab to release the mounting bracket from the housing.

A height of the housing from the bottom to an opposite top can be not greater than 2.5 inches.

A height of the housing from the bottom to an opposite top can be not greater than 2 inches.

A height of the housing from the bottom to an opposite top can be not greater than 1.75 inches.

The housing can be made of thermoplastic resin.

A method of use includes removably attaching a basking heater, as variously characterized herein to the terrarium in a position to provide radiant heat from a top of the terrarium.

A terrarium is provided having a bottom, surrounding wall extending from the bottom enclosing an interior volume, and an open top providing access to the interior volume; and a basking heater, as characterized herein, removably attached to the terrarium and positioned to provide radiant heat from the open top into the terrarium interior volume.

A variety of examples of desirable product features or methods are set forth in part in the description that follows, and in part will be apparent from the description, or may be learned by practicing various aspects of the disclosure. Aspects of the disclosure may relate to individual features, as well as to combinations of features. It is to be understood that both the foregoing general description and the following detailed description are explanatory only, and are not restrictive of the claimed invention.

DETAILED DESCRIPTION

A. Overview, FIGS. 1 and 2

Figure 1:
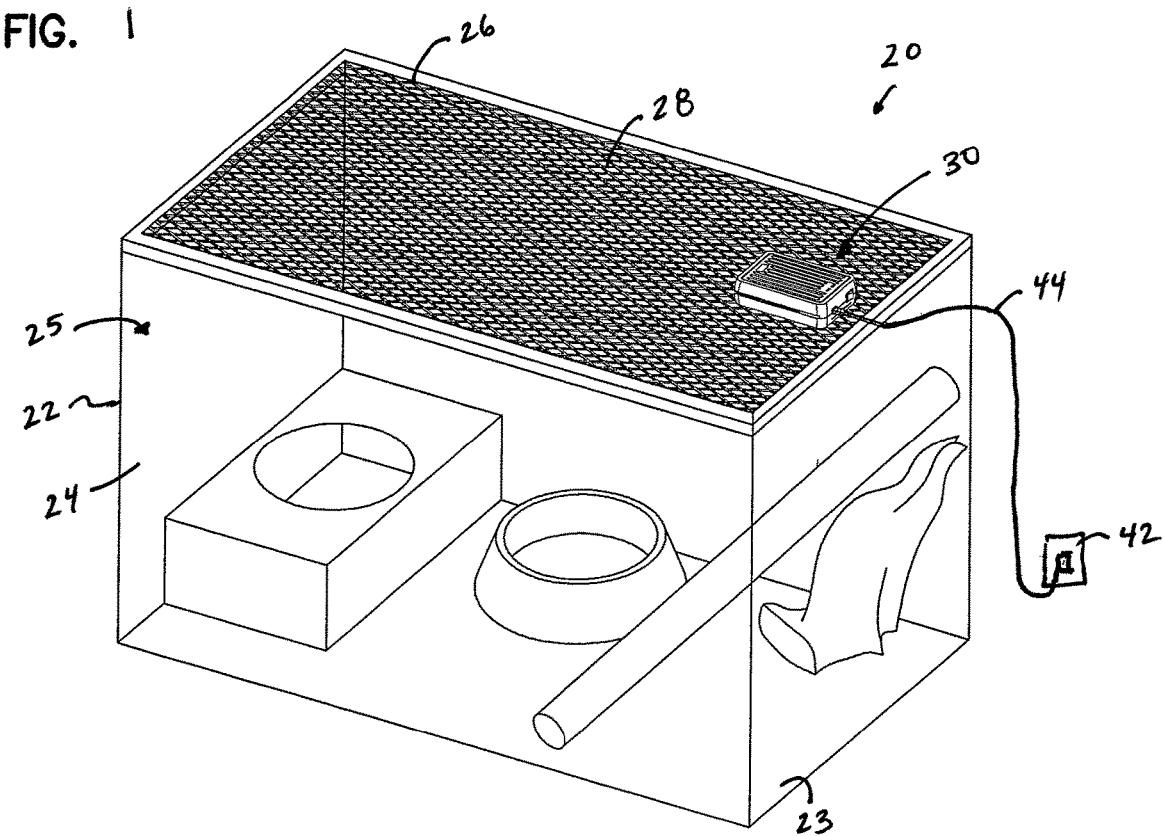
FIG. 1 is a schematic illustration of a basking heater mounted in a first way to a terrarium, in accordance with principles of this disclosure.
Figure 2:
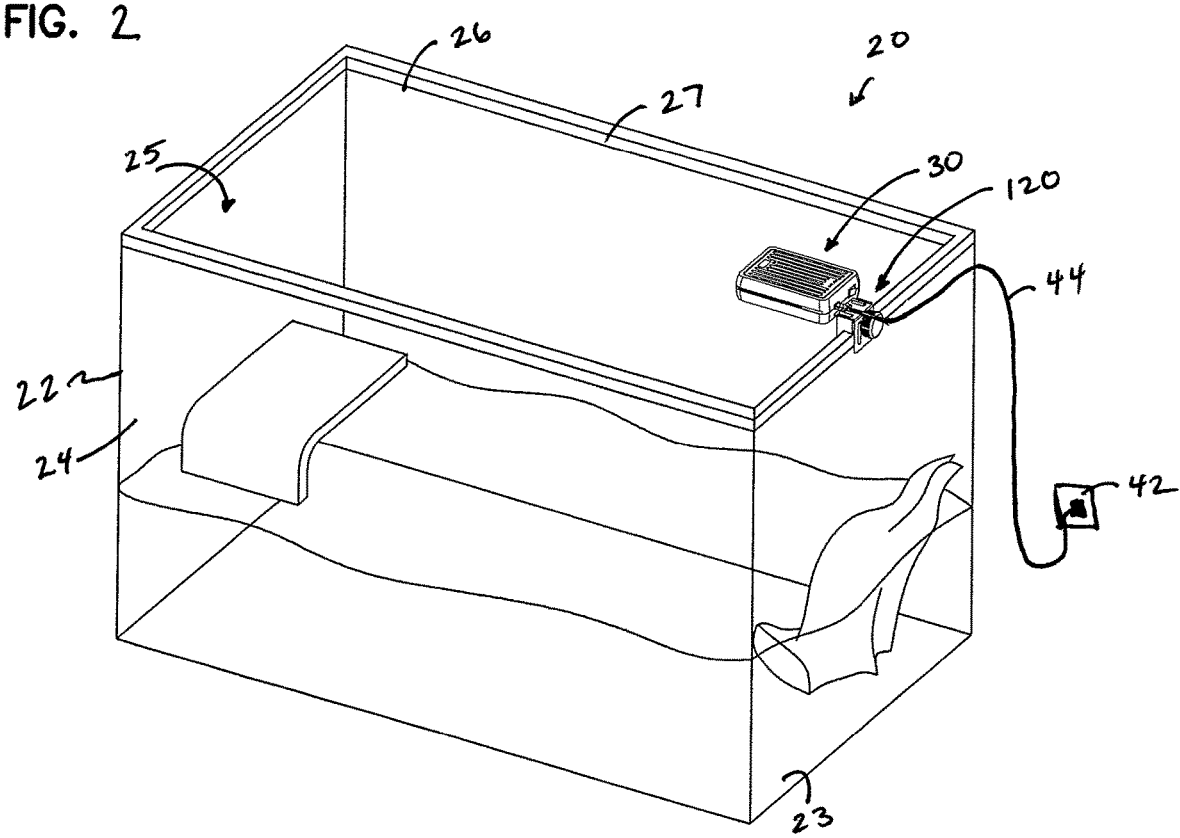
FIG. 2 is a schematic illustration of a basking heater mounted in a second way to a terrarium, in accordance with principles of this disclosure.
Figure 3:
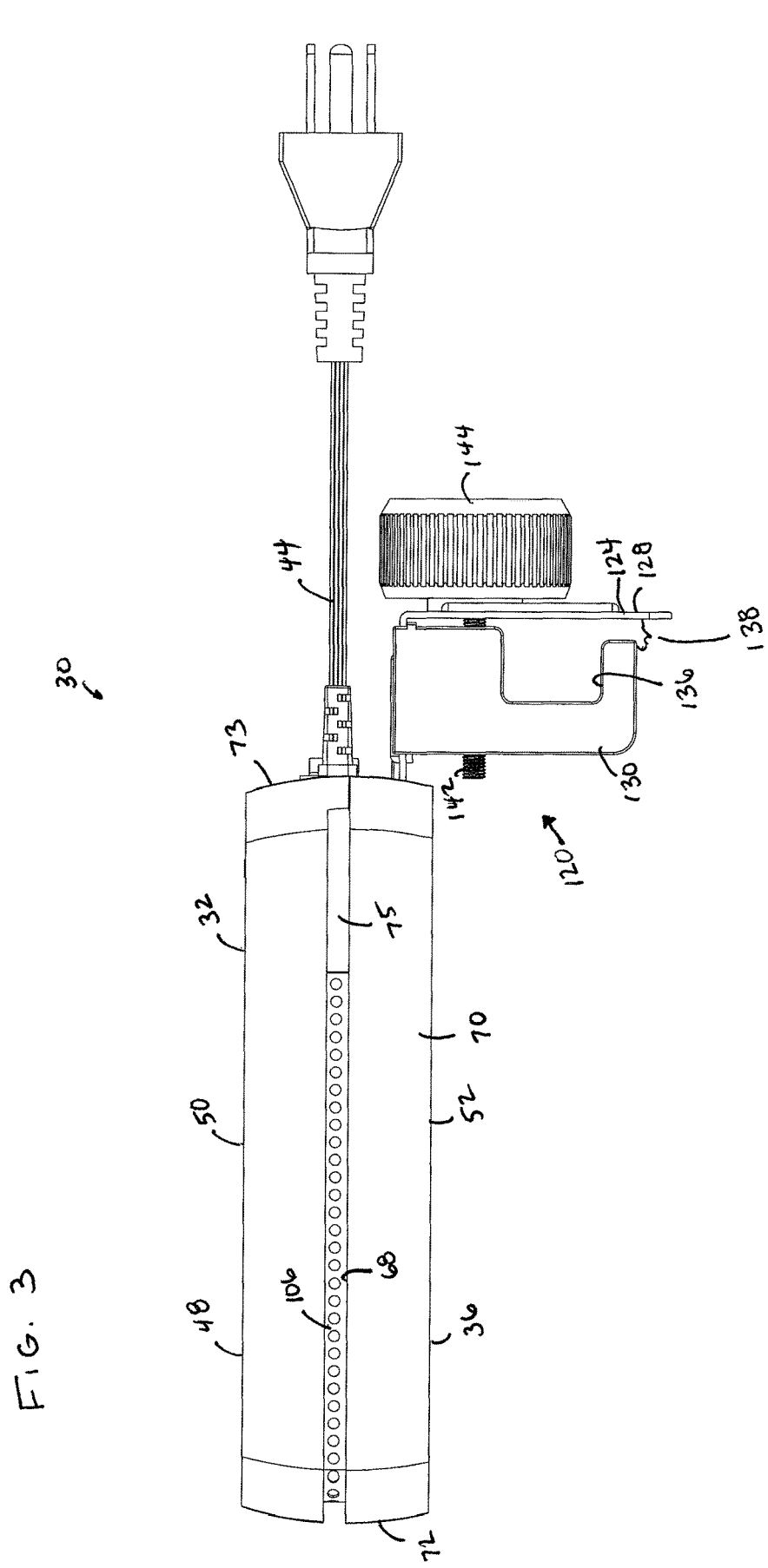
FIG. 3 is a side view of an embodiment of the basking heater of FIGS. 1 and 2.

FIGS. 1 and 2 illustrate a terrarium and heater combination 20. The terrarium 22 can be used for keeping pet animals, such as various types of reptiles, including, for example, aquatic turtles, snakes (e.g., ball pythons, Burmese pythons, milk snakes, Amazon Tree Boas, red tailed boas, corn snakes), lizards, bearded dragons, anoles, leopard geckos, etc.

The terrarium 22 has a bottom 23, a surrounding wall 24 extending from the bottom 23 enclosing an interior volume 25, and an open top 26 providing access to the interior volume 25. The open top 26 can be framed or frameless.

For keeping pets (e.g., snakes) that would be able to leave the terrarium 22 through the open top 26, some terrariums 22 have a screen cover 28 (FIG. 1) over the open top 26.

In FIGS. 1 and 2, a basking heater 30 is visible. The basking heater 30 is removably attached to the terrarium 22 and positioned to provide radiant heat from the open top 26 into the terrarium interior volume 25.

The basking heater 30 can be removably attached to the terrarium 22. By "removably attached" it is meant that the heater 30 can be repeatedly attached and removed from the terrarium 22 without destroying or breaking the heater 30 and/or the terrarium 22.

The basking heater 30 can be removably attached to the terrarium 22 in many different ways. In the example shown in FIG. 1, the heater 30 is attached to the screen cover 28. In FIG. 1, it can be appreciated that the heater 30 is attached to and against the screen cover 28. In the example shown in FIG. 2, the heater 30 is attached to the surrounding wall 24 of the terrarium 22, adjacent to a rim 27, which defines the open top 26.

In preferred embodiments, the heater 30 is constructed and arranged such that a heating element is insulated on the housing sides by material of low thermal conductivity (e.g., ceramic), and heat energy is distributed generally evenly along the top of the heating element using heat sinking metal and venting this energy by convection allowed by vents in the side and top of the heater 30. Conventional heaters cannot be made as slim using the present construction, as the surfaces would become too hot to be safe. These features are explained in further detail in Section B.

B. Example Embodiment, FIGS. 3-11

In preferred embodiments, the basking heater 30 includes a housing 32. The housing 32 is preferably made from an insulating material, such as thermoplastic resin. The heater 30 includes a heating element 34 that directs heat down onto basking animals (reptiles). The heating element 34 can be ceramic, zinc oxide coated glass, infrared lamps, nichome wire radiant elements, etc.

In preferred embodiments, the heater 30 will be smaller than the prior art spun metal dome lamps. The use of insulating members and heat radiators in the heater 30 minimizes or eliminates hot spots and dissipates heat through engineered convention vents. The result is a lower profile (overall height of less than 3 inches; and typically less than 2.5 inches; preferably less than 2 inches; and in some embodiments, less than 1.75 inches), smaller, more distinct, and more attractive heater 30 with a housing 32 that has a lower thermal conductivity than the prior art.

The housing 32 defines a bottom 36. In the example illustrated, the bottom 36 is generally substantially planar and flat. Although other arrangements are possible, having a generally flat, planar bottom 36 allows for a maximum heat transfer between the heater 30 and the terrarium 22, particularly when the terrarium 22 is covered with screen cover 28.

Figure 10:
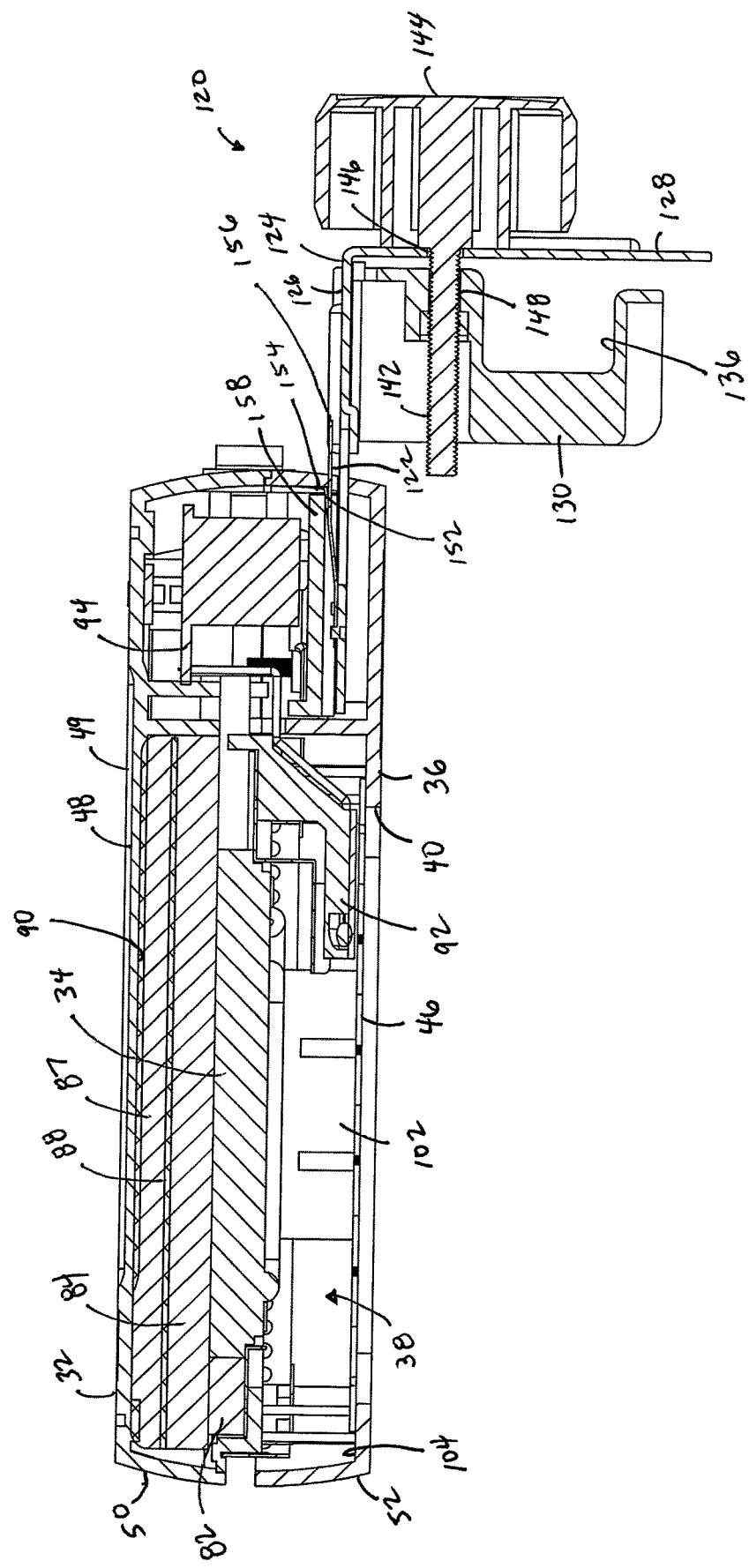
FIG. 10 is a cross-sectional view of the basking heater of FIGS. 3-8.

The housing 32 defines an interior 38 (FIG. 10). The interior 38 is what holds the heating element 34.

The bottom 36 has an opening 40 (FIGS. 4, 5, 8, and 9). The opening 40 is in communication with the interior 38.

The heating element 34 is connected to a power source 42, the example depicted in FIGS. 1 and 2 being an electrical outlet. In FIGS. 3-6, a power cord 44 can be seen extending from the housing 32. The power cord 44, when plugged into an appropriate outlet, will provide power to a switch 108 (described further below), where the power can be selectively applied to the heating element 34, in preferred embodiments.

In accordance with principles of this disclosure, the heater 30 has a porous grill 46. The porous grill 46 is in the housing interior 38 covering the opening 40 in the bottom 36. The grill 46 is between the heating element 34 and the bottom 36. The grill 46 is preferably entirely within the housing interior 38, such that no portion of the porous grill 46 extends out of the boundaries of the housing 32. The porous grill 46 is preferably made of metal.

If the heater 30 accidentally falls from the terrarium 22 onto the floor, the porous grill 46 is contained within the housing 32 so that no portion of the grill 46 directly touches the floor, and no portion of the heater 30 that does touch the floor is excessively hot. Another advantage by this arrangement is that because the porous grill 46 is installed inside of the housing 32, the heater 30 can be mounted directly to the screen cover 28, when used with terrarium 22.

Figure 6:
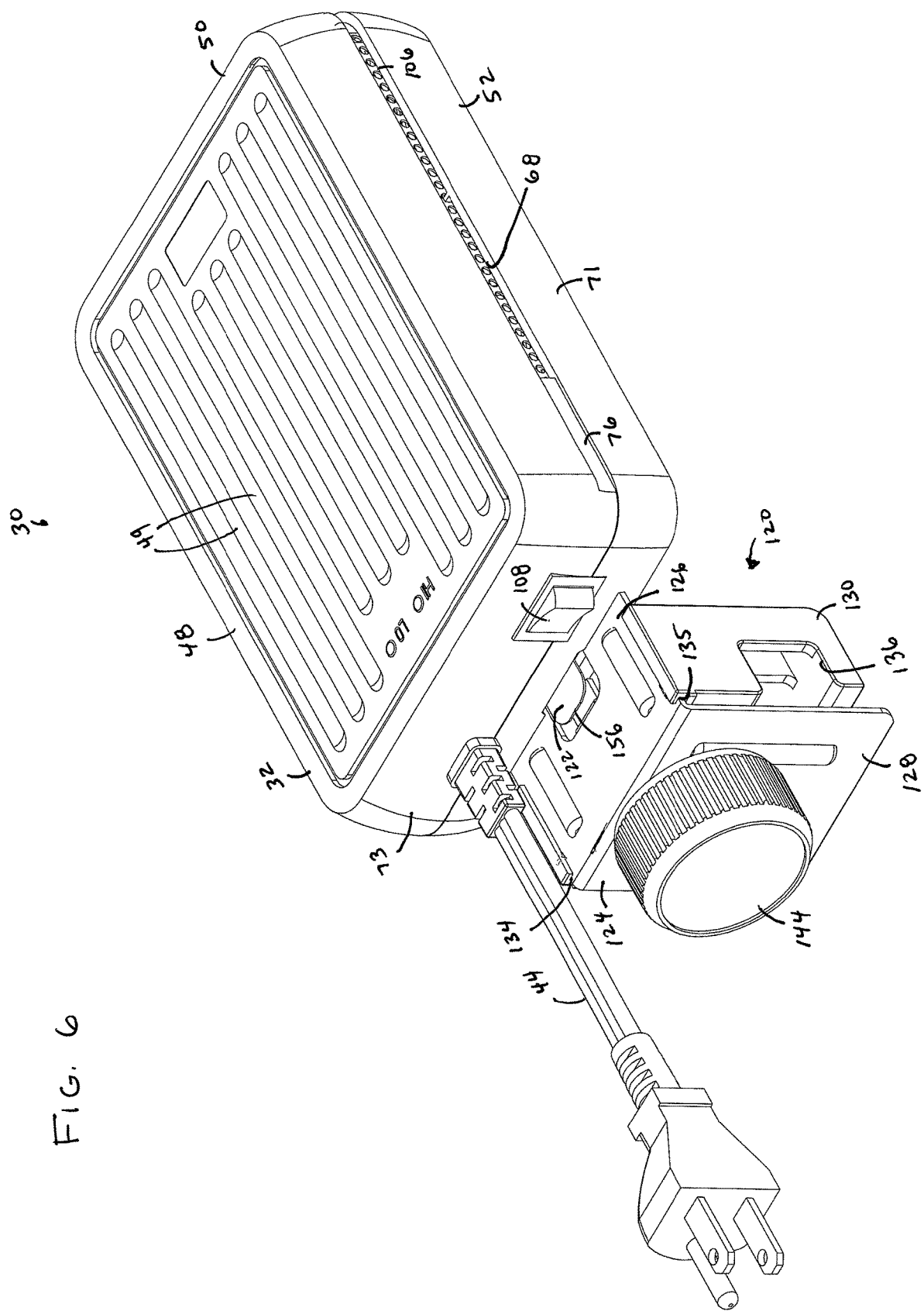
FIG. 6 is a top perspective view of the basking heater of FIGS. 3-5.
Figure 7:
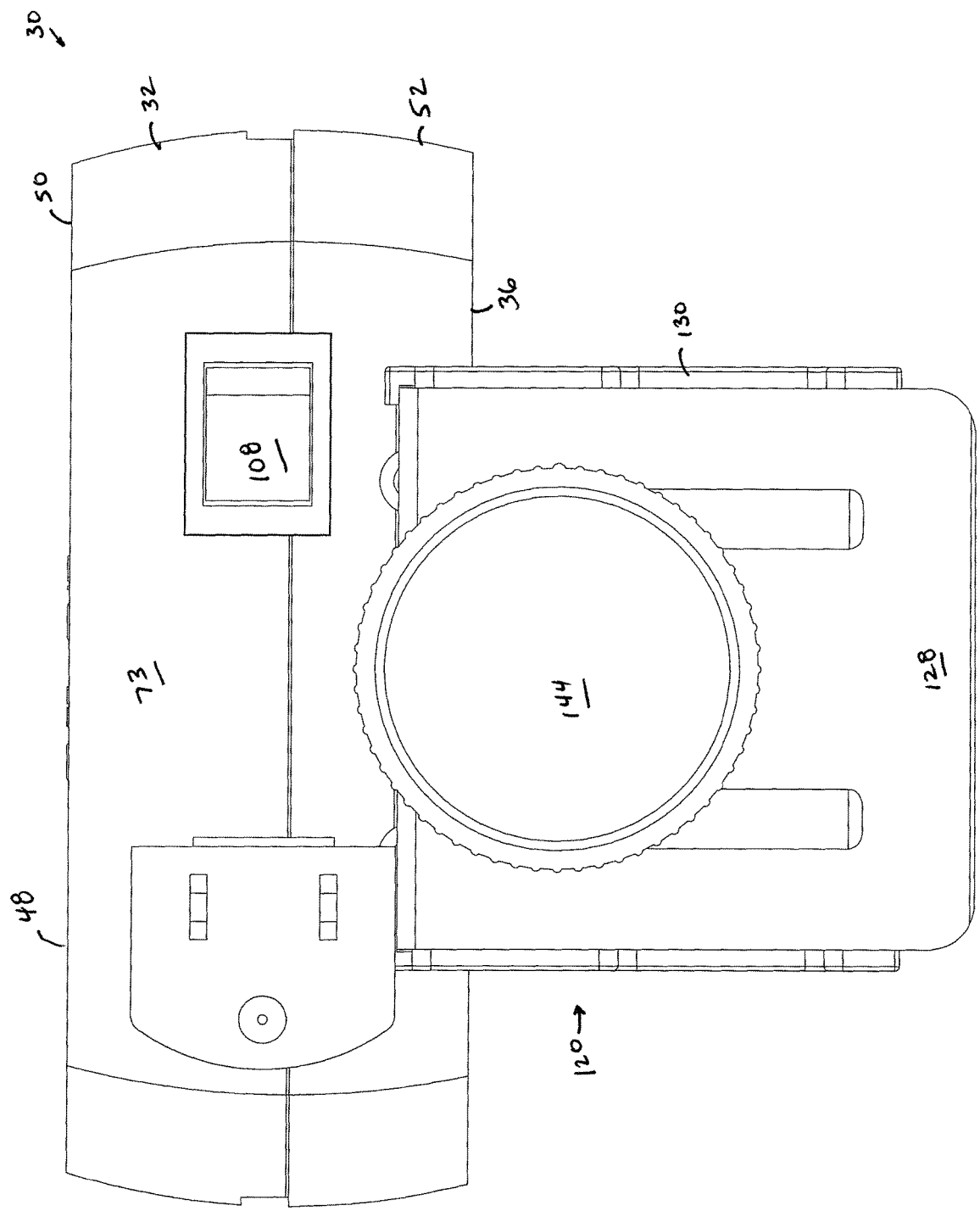
FIG. 7 is an end view of the basking heater of FIGS. 3-5.

The housing 32 includes a top 48 opposite of the housing bottom 36. FIG. 6 shows the housing top 48 as having a plurality of low-profile ribs 49, for heat radiating purposes and for strength, but other embodiments are possible. Disregarding the low-profile ribs 49, the housing top is generally flat. An overall distance between the housing top 48 and housing bottom 36 is not greater than 3 inches; and typically not greater than 2.5 inches; preferably not greater than 2 inches; and in some embodiments, not greater than 1.75 inches. Thus, the heater 30 has a low profile and is more attractive than prior art basking heaters.

Many embodiments of the housing 32 are possible. In this embodiment, the housing 32 includes a first shell 50 and a second shell 52 that fit together to define the housing interior 38. The first shell 50 defines the housing top 48, while the second shell 52 defines the housing bottom 36.

Figure 8:
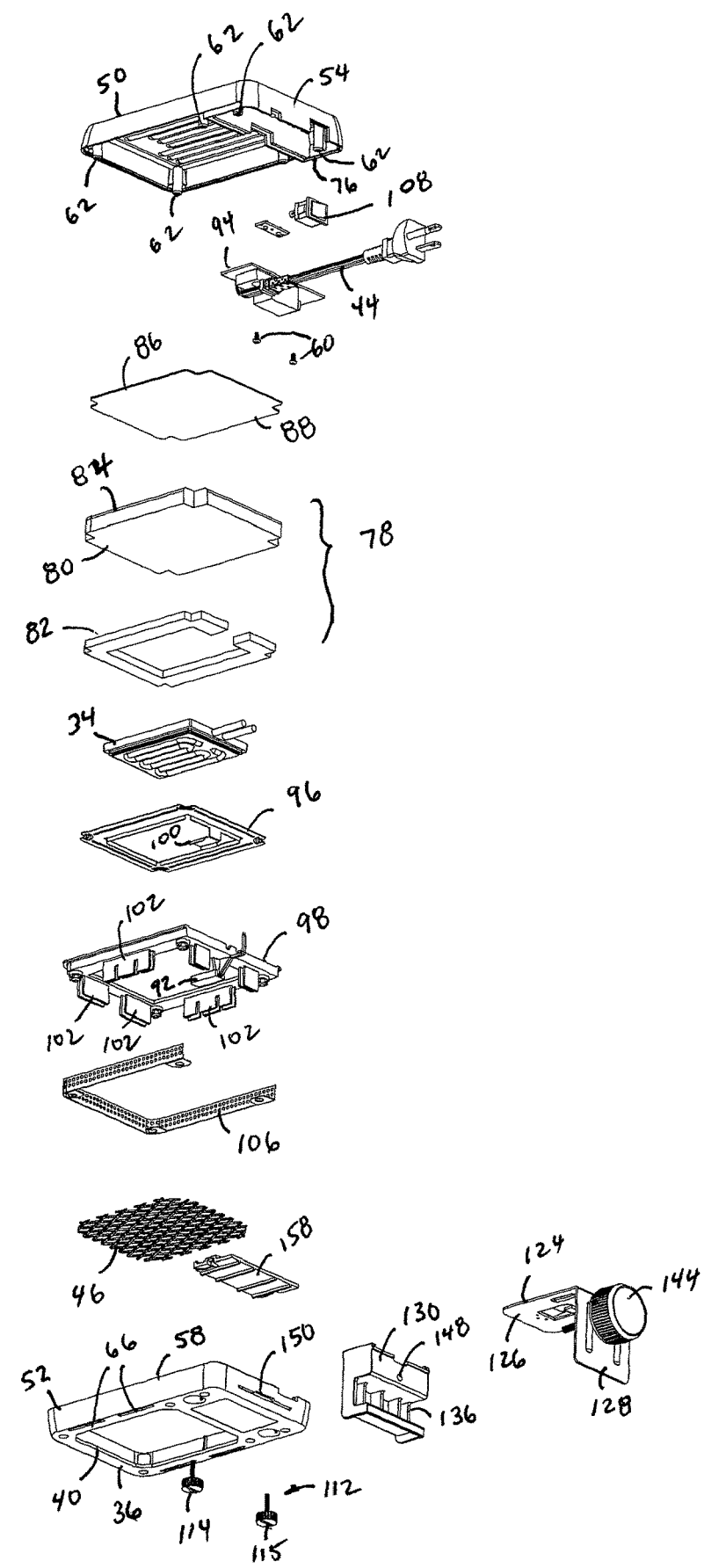
FIG. 8 is a bottom perspective exploded view of the basking heater of FIGS. 3-7.
Figure 9:
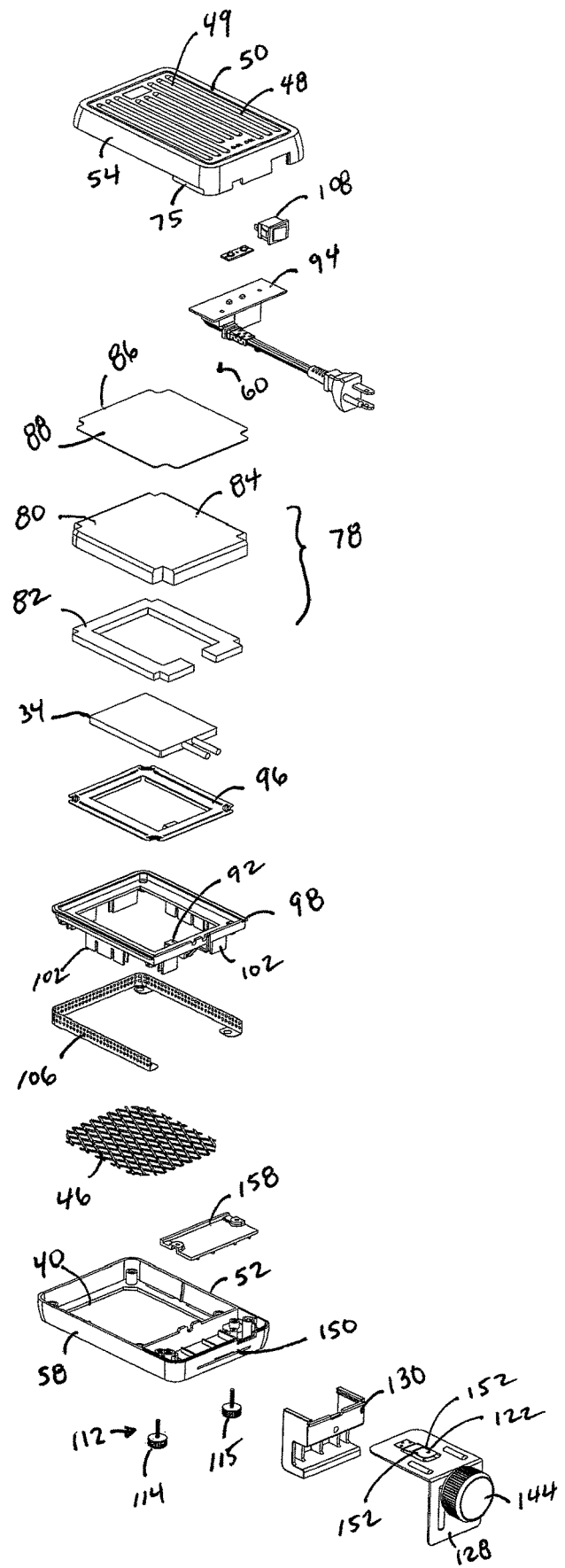
FIG. 9 is a top perspective exploded view of the basking heater of FIGS. 3-8.

In reference to FIGS. 8 and 9, the first shell 50 includes the housing top 48 with a surrounding sidewall 54 extending from the housing top 48 in a generally rectangular configuration. As mentioned, the housing top 48 can include the plurality of ribs 49 to help radiate heat and prevent hot spots.

Figure 4:
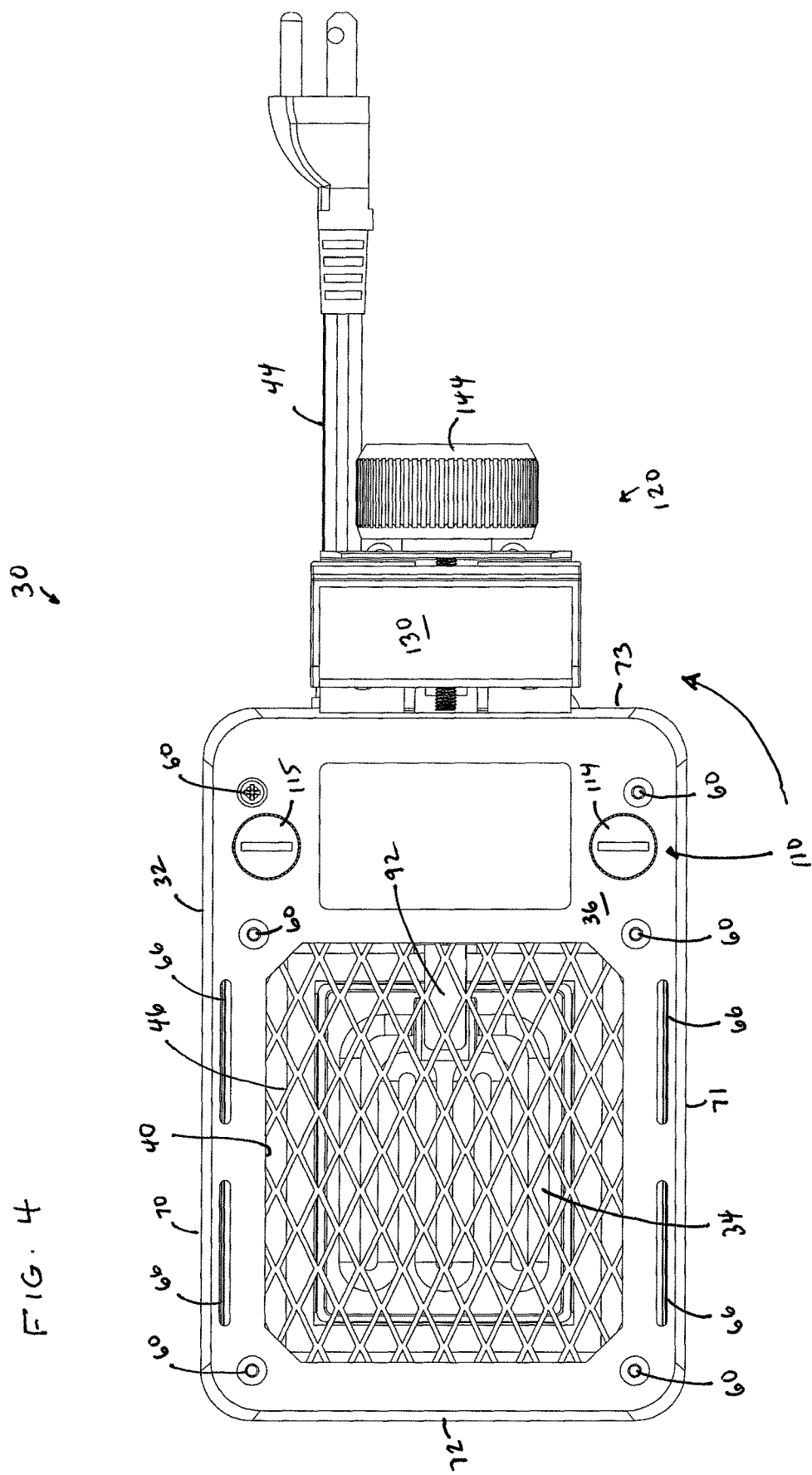
FIG. 4 is a bottom view of the basking heater of FIG. 3.

The second shell 52 includes a surrounding sidewall 58 extending from the housing bottom 36 in a generally rectangular configuration. The first shell 50 and second shell 52 can be secured together by, for example, screws 60 (FIGS. 4 and 8). In FIG. 4, the screws 60 can be seen from a bottom view protruding through the second shell 52. Threaded apertures 62 (FIG. 8) are part of the first shell 50 to receive the screws 60. When the first shell 50 and second shell 52 are connected together, the housing 32 defines four sides 70, 71, 72, 73.

Figure 5:
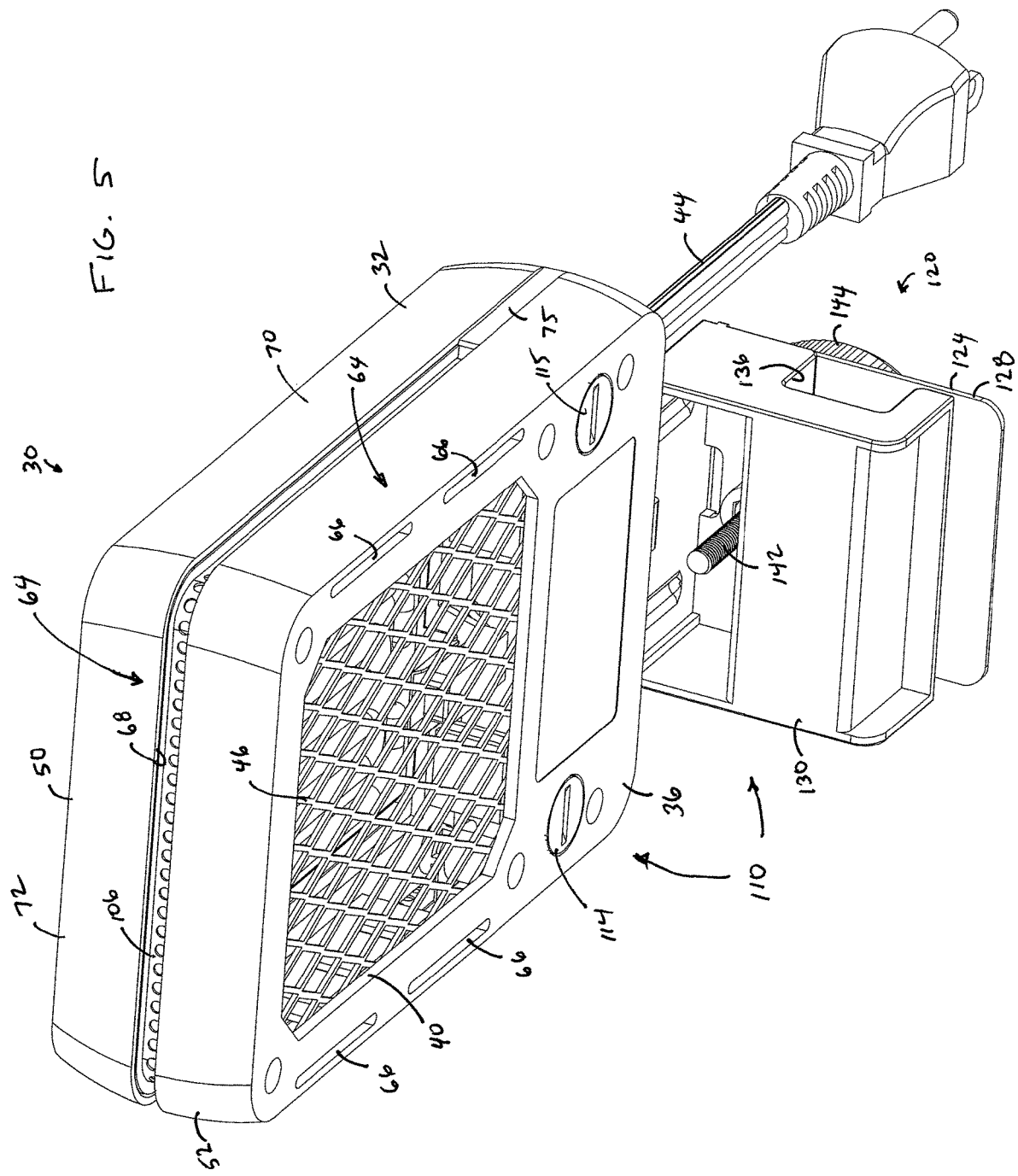
FIG. 5 is a bottom perspective view of the basking heater of FIGS. 3 and 4.

In accordance with principles of this disclosure, the housing 32 defines a vent arrangement 64 (FIG. 5). The vent arrangement 64 allows for the dissipation of heat by way of convection. Many embodiments are possible.

In one example, the vent arrangement 64 includes a plurality of slots 66. The slots 66 are in the bottom 36 of the housing 32. In FIG. 4, four slots 66 are illustrated. The slots 66 provide a flue for cooler air circulation over the inside components.

The vent arrangement 64 can include a slot 68 at an interface between the first shell 50 and second shell 52. Through a review of FIGS. 3, 5, 6, and 7, it can be appreciated that the slot 68 at the interface between the first shell 50 and second shell 52 is preferably along at least three of the four sides 70, 71, 72, 73 of the housing 32. In the embodiments shown, the slot 68 is along sides 70, 71, and 72.

The first shell 50 includes a pair of standoffs 75, 76 (FIGS. 3, 5, and 6), such that when the first shell 50 and second shell 52 are operably secured to each other with the screws 60, the standoffs 75, 76 allow for a gap, defining slot 68, between the first shell 50 and second shell 52. Preferably, the slot 68 will be an opening that is not large enough to allow a human finger to penetrate. For example, the slot 68 will be no wider than 5 millimeters.

In accordance with principles of this disclosure, the heater 30 preferably includes an insulating arrangement 78 (FIGS. 8 and 9). The insulating arrangement 78 can be adjacent to the heating element 34. The heating element 34 will be between the insulating arrangement 78 and the porous grill 46. The insulating arrangement 78 will ensure that the housing top 48, and generally the upper portion of the housing 32 are cooler.

In one example, the insulating arrangement 78 includes ceramic cloth 80. The ceramic cloth 80 can act as a ceramic refractive material filling the volume between the element 34 and the housing top 48 to insulate the top, exposed surface of the housing 32. The ceramic cloth 80 provides a barrier for heat flow in the direction that is not intended for heat flow. In the example shown in FIGS. 8 and 9, the ceramic cloth 80 is shown as two pieces, a rectangular piece 84, and a frame piece 82. Of course, this is just one example, and many embodiments are possible.

The heater 30 can further include a heat conductor 86 (FIGS. 8 and 9). The heat conductor 86 provides a way of spreading residual heat over a larger area to help reduce high temperature areas or hot spots. In the embodiment shown, the heat conductor 86 comprises a metal plate 88. The metal plate 88 is operably installed between the housing top 48 and the ceramic rectangular cloth piece 84. There can be further insulation material 87 (FIG. 10), such as more ceramic cloth, installed between and against an inner surface 90 of the housing top 48 and the metal plate 88.

In accordance with principles of this disclosure, the basking heater 30 can further include a temperature probe 92. The temperature probe 92 is oriented in the path of the radiant heat from the heating element 34. If the heater 30 is placed on a flat surface with the bottom 36 oriented against the flat surface without adequate ventilation, the temperature of the temperature probe 92 will rise, and the power will be disconnected to the heating element 34. This temperature probe 92 is intended to prevent the heater 30 from burning or charring furniture or flooring.

In the illustrated embodiment, the temperature probe 92 is between the heating element 34 and the porous grid 46. In FIGS. 8 and 9, a circuit board 94 can be seen to be part of the heater 30. The circuit board 94 includes a logic chip with control logic to disconnect power from the heating element 34 when the temperature probe 92 exceeds a set, predetermined value.

Still in reference to FIGS. 8 and 9, other inner components of the heater 30 are illustrated. A first frame piece 96 is illustrated between the heating element 34 and a second frame piece 98. The second frame piece 98 holds the temperature probe 92. The first frame piece 96 includes a projecting shield 100 to cover the temperature probe 92 from direct radiant heat from the heating element 34. The first frame piece 96 can be made from stamped sheet metal, and it will rest within the second frame piece 98.

The second frame piece 98 can be made from plastic, such as thermal plastic resin. The second frame piece 98 includes a plurality of legs 102 extending in a direction away from the heating element and toward the housing bottom 36. The legs 102 are illustrated as being on each of the four sides of the second frame piece 98. The legs 102 can be used to pin down or hold the porous grill 46 in place against an inside surface 104 of the bottom 36 of the second shell 52.

Also illustrated in FIGS. 8 and 9 is a third frame piece 106. The third frame piece 106 preferably encloses three sides of the second frame piece 98. The third frame piece 106 can be made of metal, and is viewable through the slot 68 at the interface between the top first shell 50 and second shell 52.

Further visible in FIGS. 8 and 9 is a clamp plate 158, which is usable with a clamp 120, to be described further below.

In accordance with principles of this disclosure, the heater 30 includes a power switch 108. The power switch 108 will control the amount of power being supplied to the heating element 34. While in a simple form, the power switch 108 can simply provide an on/off switch, in preferred embodiments, the power switch 108 will have at least three settings. The three settings include no power; low power; and high power.

The nominal power at the high setting can be about 41 W+/−10% . The nominal power at the low setting can be about 27 W+/−10%. The wattages correspond to tested target basking temperatures at 10 inches from the bottom 36 of the heating element 34. Tropical reptiles prefer to bask at about 85° F., while desert reptiles prefer to bask up to 105° F. The high setting accommodates the desert reptiles, while the low setting accommodates the tropical reptiles and turtles. Basking temperatures based on species include:

| Reptiles | | Basking Temperature ° F. |
| --- | --- | --- |
| Aquatic turtles | | 80-85 |
| Snakes | | |
| | Ball Pythons | 85-95 |
| | Burmese Pythons | 90 |
| | Milk Snakes | 84-88 |
| | Amazon Tree Boas | 90 |
| | Red Tail Boas | 90-95 |
| | Corn Snakes | 88-90 |
| Bearded Dragons | | 95-105 |
| Anoles | | 88-90 |
| Leopard Geckos | | 85-90 |

In preferred embodiments, the heating element 34 may take time to achieve a steady state temperature. The heating element, in some embodiments, does not light up or otherwise indicate that it is on, other than by the heat, especially when initially turned on. Indicator lights, such as LEDS, illuminate through the housing top 48 beside high and low text on the housing 32 to provide feedback to the end user that the heater is turned on and at what setting. The power switch 108 is preferably a 3-position switch with positions for high, off, and low.

In accordance with principles of this disclosure, the basking heater 30 includes a mounting or an attachment arrangement 110 (FIGS. 4 and 5) adapted to selectively attach the heater 30 to the terrarium 22. Many embodiments are possible. The attachment arrangement 110 provides secure mounting against, for example, cord pulling or accidental bumping, as contrasted with prior arrangements that use just a spring clamp.

In a first embodiment of the attached arrangement 110, the attachment arrangement 110 includes at least one fastener 112 (FIGS. 8 and 9) selectively securable to the housing bottom 36. The fastener 112 is adapted to permit selective attachment to the screen cover 28 on terrarium 22.

As embodied herein, the fastener 112 includes a thumbscrew 114 threadably securable into the housing bottom 36. In the example shown, the thumbscrew 114 includes first and second thumbscrews 114, 115.

To attach the heater 30 to a screen cover 28, the thumbscrews 114, 115 are removed from the housing 32. The heater 30 is mounted directly against the screen cover 28, and then the thumbscrews 114, 115 are threadably secured through the screen cover 28 and into the housing 32. This allows the heater 30 to be mounted directly against the screen cover 28 to allow for effective heat transfer. See FIG. 1. Attaching the heater 30 to the screen cover 28 allows for one-handed operation of the screen cover 28, without needing to place the heater 30 to one side, which could be on an object that is not intended to handle the heat, so it enhances safety.

When the thumbscrews 114, 115 are not used, in the example that an alternate attachment arrangement 110 is used, the thumbscrews 114, 115 are mountable flush against the housing bottom 36, as can be seen in FIG. 5. The thumbscrews 114, 115 are mountable in the housing bottom 36 in the second shell 52 adjacent to the opening 40.

In another embodiment, the attachment arrangement 110 comprises a mounting bracket 120 adapted to permit selective attachment to the top rim 27 of the terrarium 22. The bracket 120 includes a depressable tab 122 to release the mounting bracket 120 from the housing 32, when it is desirable to remove the housing 32 from the bracket 120. The tab 122 must be depressed to release the housing 32 from the bracket 120, which prevents the possibility of accidental release or immersion if the heater 30 is bumped, or the power cord 44 is pulled.

Many embodiments of mounting bracket 120 are possible. In the illustrated embodiment, the mounting bracket 120 includes a first bracket member 124. The first bracket member 124 has an L-shaped profile which includes a top plate 126 and a side plate 128 generally orthogonal to each other. The top plate 126 defines the spring tab 122, which is deflectable toward and away from a remaining portion of the top plate 126.

Figure 11:
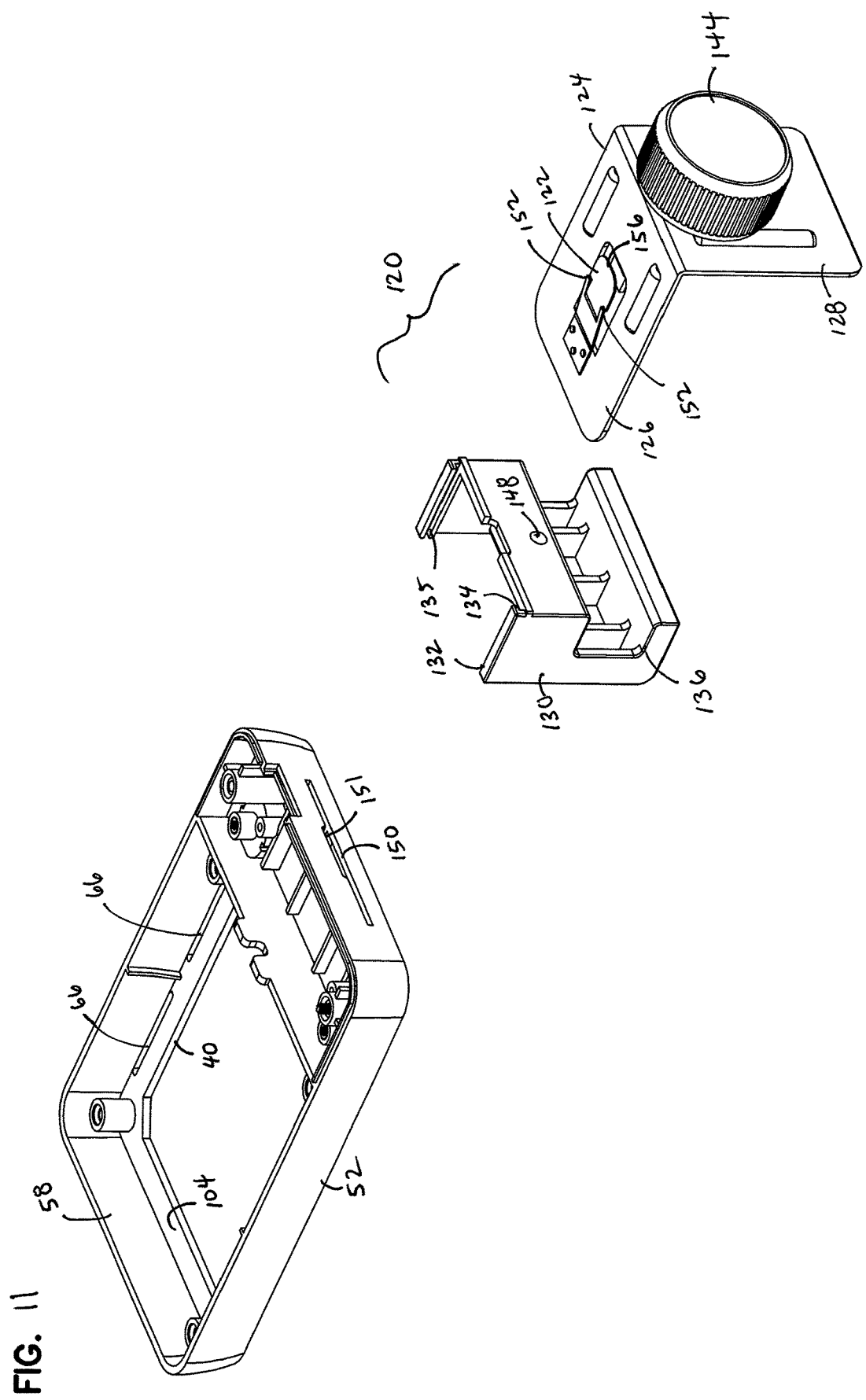
FIG. 11 is an enlarged exploded perspective view of a portion of the housing and a clamp assembly.

The mounting bracket 120 further includes a second bracket member 130. In FIG. 11, it can be seen how the second bracket member 130 defines slide rails 134, 135 along a top rim 132. The slide rails 134, 135 receive edges of the top plate 126 of the first bracket member 124. In this manner, the second bracket member 130 slidably holds the first bracket member 124.

The second bracket member 130 defines a C-shaped opening 136, which faces the side plate 128, when the first bracket member 124 and second bracket member 130 are connected to each other. The C-shaped opening 136 can accommodate a frame for terrarium 22. Further, if the terrarium 22 does not have a frame, then the surrounding wall 24 of the terrarium 22 can fit in the space 138 between the wall 140 that faces the first bracket member 124 and the side plate 128 of the first bracket member 124.

The mounting bracket 120 further includes a threaded bolt 142 with an adjustment knob 144. The bolt 142 passes through a hole 146 in the side plate 128 of the first bracket member 124 and is received by a threaded aperture 148 in the second bracket member 130. The first bracket member 124 can be slid within the slide rails 134, 135 of the second bracket member 130 in order to adjust the space 138 to accommodate the appropriate thickness of the surrounding wall 24 of the terrarium 22, with or without a frame. Once the surrounding wall 24 is fit in the space 138 between the second bracket member 130 and the side plate 128 of the first bracket member 124, the knob 144 can be rotated so that the bolt 142 is moved within the threaded aperture 128, and which will tighten the side plate 128 against an outside surface of the surrounding wall 24, while the second bracket member 130 is tightened against an inside surface of the surrounding wall 24 of the terrarium 22.

As mentioned above, the tab 122 is used to release the mounting bracket 120 from the housing 32. In FIGS. 6, 8, 9, and 11, it can be seen how the second shell 52 of the housing 32 includes a slot 150 to receive the top plate 126. The slot 150 has a taller opening 151 (FIG. 11) along a portion of the slot 150 to accommodate the depressable tab 122. When the top plate 126 is inserted in the slot 150, the tab 122 will deflect in a direction toward the rest of the top plate 126. After the top plate 126 has been inserted far enough for tangs 152 on the tab 122 to be received within the housing 32, the tab 122 is deflected away from a remaining portion of the top plate 126 so that the tangs 152 deflect upwardly (the orientation of FIG. 10) against the clamp plate 158, and catch or engage an inner catch surface 154 (FIG. 10) of the housing 32. To release the housing 32 from the mounting bracket 120, a free end 156 of the tab 122 is pressed in a direction toward a remaining portion of the top plate 126. This moves the tangs 152 out of engagement with the inner catch surface 154, and the bracket member 120 can then be removed from the slot 150 in the housing 32.

The basking heater 30 can be used to heat an animal in a terrarium. The method includes removably attaching the basking heater 30 to the terrarium 22 in a position to provide radiant heat from the top 26 of the terrarium 22. The basking heater 30 can be constructed according to principles described above.

The above represents principles of this disclosure. Many embodiments can be made using these principles.

What is claimed is:

1. A basking heater comprising:
   (a) a housing defining a bottom and defining an interior; the bottom having an opening in communication with the interior; the housing including a top opposite of the bottom;
   (b) a heating element within the housing interior; the heating element being connected to a power source and oriented to radiate heat through the opening in the bottom;
   (c) an attachment arrangement adapted to selectively attach the heater to a terrarium; wherein a height of the housing from the bottom to the top is not greater than 3 inches;
   (d) a porous grill in the housing interior extending over and covering the opening in the bottom; the porous grill being between the heating element and the bottom; the porous grill being opposite of the top of the housing; and
   (e) a power switch controlling an amount of power to the heating element; the power switch having at least 3 settings including no power, low power, and high power.

2. The basking heater of claim 1 wherein:
   (a) the housing bottom is planar.

3. The basking heater of claim 1 wherein:
   (a) the grill is entirely within the housing interior.

4. The basking heater of claim 1 wherein:
   (a) the housing includes a first shell and a second shell that fit together to define the interior; the second shell having the bottom.

5. The basking heater of claim 4 wherein:
   (a) the housing defining a vent arrangement.

6. The basking heater of claim 1 further comprising:
   (a) an insulating arrangement adjacent to the heating element, the heating element being between the insulating arrangement and the housing bottom.

7. The basking heater of claim 6 wherein:
   (a) the insulating arrangement comprises a ceramic cloth.

8. The basking heater of claim 1 further comprising:
   (a) a temperature probe between the heating element and the housing bottom; and
   (b) a circuit board with control logic to disconnect power from the heating element when the temperature probe exceeds a predetermined value.

9. The basking heater claim 1 wherein:
   (a) the attachment arrangement includes at least one fastener selectively securable to the housing bottom, adapted to permit selective attachment to a screen cover on a terrarium.

10. The basking heater of claim 1 wherein:
    (a) the attachment arrangement comprises a mounting bracket adapted to permit selective attachment to a top rim of a terrarium.

11. The basking heater of claim 1 wherein:
    (a) a height of the housing from the bottom to an opposite top is not greater than 1.75 inches.

12. The basking heater of claim 1 wherein:
    (a) the housing is made of thermoplastic resin.

13. The basking heater of claim 9 wherein:
    (a) the fastener includes a thumbscrew threadably securable into the housing bottom.

14. The basking heater of claim 10 wherein:
    (a) the mounting bracket includes a depressable tab to release the mounting bracket from the housing.

15. The basking heater of claim 1 wherein:
    (a) the low power comprises about 27 W; and the high power comprises about 41 W.

\* \* \* \* \*